United States Patent [19]

Zanier et al.

[11] Patent Number: 5,664,336
[45] Date of Patent: Sep. 9, 1997

[54] LINEAR MEASURING DEVICE AND A METHOD OF ADJUSTING SAID DEVICE

[75] Inventors: Adriano Zanier, Prilly; Alex Bezinge, Yens, both of Switzerland

[73] Assignee: Tesa Brown & Sharpe SA, Renens, Switzerland

[21] Appl. No.: 590,909

[22] Filed: Jan. 24, 1996

[30] Foreign Application Priority Data

Jan. 30, 1995 [EP] European Pat. Off. ............ 95810052

[51] Int. Cl.[6] .................................................. G01B 11/04
[52] U.S. Cl. .................................................. 33/706; 33/707
[58] Field of Search ........................... 33/706, 700, 701, 33/703, 707, 708, 710

[56] References Cited

U.S. PATENT DOCUMENTS

| | | |
|---|---|---|
| 3,696,667 | 10/1972 | Foster et al. |
| 4,878,013 | 10/1989 | Andermo. |
| 4,974,332 | 12/1990 | Luttmer et al. ............... 33/706 |
| 5,172,485 | 12/1992 | Gerhard et al. ............... 33/706 |
| 5,373,645 | 12/1994 | Bezinge et al. ............... 33/703 |

FOREIGN PATENT DOCUMENTS

| | | |
|---|---|---|
| 0579961A1 | 1/1994 | European Pat. Off. . |
| 2050419 | 4/1971 | France . |
| 3508143A1 | 9/1986 | Germany . |
| 1352707 | 5/1974 | United Kingdom . |

OTHER PUBLICATIONS

Patent Abstracts of Japan, vol. 7, No. 125, (P-200) [1270], May 31, 1983 (JP-A-58 041302).

*Primary Examiner*—Christopher W. Fulton
*Attorney, Agent, or Firm*—Jacobson, Price, Holman & Stern, PLLC

[57] ABSTRACT

A linear measuring device comprising a scale fixed on a supporting structure along which a slide can slide. A transducer connected to the slide permits, in cooperation with the scale, determination of at least one coordinate of a point connected to the slide in a system of coordinates connected to the supporting structure. The transducer is fixed to the slide at three points by a mounting device having at each point a screw engaged in a partially threaded opening of a column and a spring. In acting on one of the screws at each of the said points, the spacing can be changed between the detection device and the slide. The spring keeps the spacing as large as the engagement of the screw in the said opening permits. The detection device is of the capacitive or electro-optical type and is mounted on a transducer support. The slide slides by means of rollers, part of the rollers rolling on guide surfaces belonging to the same plane as the surface of the supporting structure to which the scale is fixed.

8 Claims, 2 Drawing Sheets

LINEAR MEASURING DEVICE AND A METHOD OF ADJUSTING SAID DEVICE

This invention has as its subject matter a device for measuring size and a method of adjusting said device. More specifically, this invention has as its subject matter a device for electronic linear measurement comprising a scale fastened on a supporting structure along which a slide can slide, as well as a transducer placed facing the scale and permitting in cooperation therewith to determine at least one coordinate of a point associated with the slide in a system of coordinates associated with the supporting structure.

Such devices are used, for example, in shops for the manufacture of mechanical parts to measure and verify the dimensions of pieces. U.S. Pat. No. 5,373,645 (BEZINGE), published on 20 Dec. 1994, the content of which is incorporated here as a reference, describes devices of this type for measuring size.

They generally comprise a scale fastened to a supporting structure along which a slide can slide, a measuring head associated with the slide and a transducer associated with the slide. The piece to be measured is generally immobilized, and the measuring head is brought by displacement of the slide into contact with certain points of the piece. The transducer, in cooperation with the scale, allows one or more coordinates of the measuring head to be provided in a system of coordinates generally linked to the supporting structure. In the case of a vertical supporting structure, one can determine the height of various points of the piece and, by subtraction of successive measurements, the diameters of boring, for example. A data processing unit can be connected to the device for processing, display and storage of the data. Depending upon the type of device, the supporting structure and the slide can also be horizontal for carrying out measurements of length. Also known are devices with several axes, having several slides, for carrying out multidimensional measurements.

Reading of the dimension to be measured takes place in the device disclosed in the aforementioned patent using electro-optical means. More precisely, the scale 57 fixed to the supporting structure is a scale of glass with high contrast divisions, and the transducer is a transducer of the electro-optical type providing a signal dependent on the number of divisions sensed by the transducer.

Likewise known are other methods of reading with capacitive type means. In these methods, the scale includes an array of electrodes of pre-determined size, and the transducer has a second array of electrodes, of generally lesser or equal size. The capacitance resulting between these two arrays of electrodes depends upon their overlapping and thus their respective position, which permits determination of the position of the measuring head. The U.S. Pat. No. 4,878,013 (Andermo), for example, describes such devices.

In the device of the aforementioned patent U.S. Pat. No. 5,373,645, the transducer 58 is simply screwed on the slide 4 facing the graduated scale 57. The parallelism and the distance between the transducer and the scale, on which the precision of measurement greatly depends, are thus solely a function of the precision of manufacture of the scale-supporting structure-slide-transducer assembly. Strict manufacturing tolerances must be applied to each of the elements, which add considerably to the cost of the device. Moreover it is extremely difficult to correct defects in parallelism which appear after manufacture, for example as a result of impacts, swelling or distortion.

The U.S. Pat. No. 5,172,485 describes a device (FIG. 7A, 7B, 7C) in which the transducer is fastened with putty in a frame sliding directly against the scale. Springs retain the transducer. The precision of measurement depends solely on the precision of manufacture of the different elements, in particular the frame. No subsequent correction is possible.

In the device illustrated by FIGS. 3 to 5 of U.S. Pat. No. 5,172,485 the transducer is maintained in direct contact with the scale by means of spring blade arms. This solution requires a-coating on the electrodes of the transducer. This coating must have at the same time good dielectrical properties and a weak coefficient of friction. Moreover, the coating is subject to wear and tear. No subsequent correction is possible. German patent document DE-A-3 508 143 describes a linear measuring device with two coordinates. An intermediate piece is provided between the slide and a slideway on each side of the slide. A device having a screw and a spring permits compensation of the play which can exist between the slide and the intermediate piece, and keeps the intermediate piece pressed against the slideways. This arrangement facilitates the sliding of the slide, but absolutely does not allow adjustment of parallelism nor of the distance between the measuring head and the scale.

U.S. Pat. No. 3,696,667 discloses a measuring device using an elastically extensible scale. The spring means are foreseen to extend the scale more or less in fulfilling the object of calibrating the device. This invention absolutely does not concern the problem of parallelism nor that of the spacing between the transducer and the scale.

French patent FR 2 050 419 describes another linear measuring device in which the only means used to adjust the spacing between the slide and the scale are elastic runners, or elastic pieces pressed against the scale.

Japanese patent JP 58 41302 describes a positioning device using screw means and spring means to advance rods permitting measurement of the thickness of a piece at different places. This document absolutely does not concern the placement of a transducer parallel to a scale.

Known are systems of adjustment of the distance scale to transducer by means of shims or intercalated washers between the transducer and the slide. During manufacture adjustment of the parallelism and the distance is carried out by interposing successively shims or washers of increasing thickness at different places between the transducer and the slide until a parallelism considered to be sufficient is obtained. Besides the fact that this adjustment has proved to be time-consuming and tedious, its precision is limited by the number of shims or washers of different thicknesses which can be disposed. This system is thus not suitable for devices which must provide precision in making measurements of less than 0.01 millimeters, and a correction of the parallelism after manufacture is only possible by disassembling the whole transducer and replacing all or part of the shims or washers with shims or washers of different thickness in as far as they are available. Moreover, these systems only allow adjustment of parallelism and the distance between the transducer and the scale with the slide at a given position. To ensure that this parallelism and this distance can be maintained for any position of the slide, it is necessary to carry out a meticulous and costly machining of the supporting structure.

An object of the invention is thus to propose a measuring device of the type initially mentioned in which the distance and the parallelism between the transducer and the scale can be adjusted very simply, and even after manufacture.

Another object is to propose a measuring device of the type initially mentioned in which the distance and the parallelism can be adjusted in a precise way, compatible with carrying out measurements on the order of 0.001 millimeters.

Another object of the invention is to propose a measuring device of the type initially mentioned in which a parallel displacement of the transducer opposite the scale is ensured by means of a simplified machining of the supporting structure.

Still a further object of the invention is to propose a method of adjusting the distance and the parallelism of the transducer and the scale of a measuring device of the type initially mentioned.

To achieve this, according to a first feature of the invention, the linear measuring device comprises:

a supporting structure, a scale fixed on said supporting structure, a slide which can slide along said supporting structure, a transducer facing said scale and permitting in cooperation therewith to determine at least one coordinate of a point associated with said slide in a system of coordinates associated with said supporting structure, mounting means permitting to fix said transducer to said slide at at least three points, said mounting means including at at least one of said points a threaded piece engaged in an opening at least partially threaded and at least one spring, so that an action at each of the said points on said screw permits change of the spacing between said transducer and said slide, said spring keeping this spacing as large as the engagement of said screw in said opening permits, in a way to be able to adjust the parallelism and the distance between said transducer and said scale.

According to a further feature of the invention, the device further comprises a transducer support on which the transducer is fixed, the said transducer support being itself fixed to said slide by means of said mounting means, the slide comprises an opening and said transducer support comprises:

a base plate to which said transducer is fastened, said base plate being accommodated in said opening, at least one footing permitting fastening to said slide, said footing or footings extending out of said opening overhanging said slide at a distance adjustable with the aid of said mounting means.

According to a further feature of the invention, the said mounting means at at least one of the said points further comprise a column pierced at its center by the said threaded opening on at least one part of its length, the screw-column assembly being surrounded by the said spring, the said screw-column assembly passing through the slide and the transducer support in such a way that it is possible by acting upon the said screw to change the spacing between the slide and the transducer support.

Still a further feature of the invention is the method of adjusting an electronic linear measuring device having a supporting structure, a scale fastened to said supporting structure, a slide which can slide along said supporting structure, a transducer fastened at at least three points to said slide, said transducer permitting measurement of the displacement of said slide with respect to the scale, wherein it comprises the following operations:

introduction of at least one element permitting a comparison to be made of the distance between the scale and the transducer with one or more calibrated distances;

adjustment of at least one screw for positioning and orientation of said transducer until the distance at each of the said points corresponds to a calibrated distance, maintaining of the positioning of said transducer after the adjustment by a spring provided at each of the said points.

The invention will be now explained in more detail, with reference to the accompanying figures in which.

The specification describes in particular the case of a measuring device with a single vertical axis, of the type described in the aforementioned U.S. Pat. No. 5,373,645. Nevertheless it is evident that the invention can be adapted without difficulty to measuring devices having one or more axes of any orientation.

Figure 1:
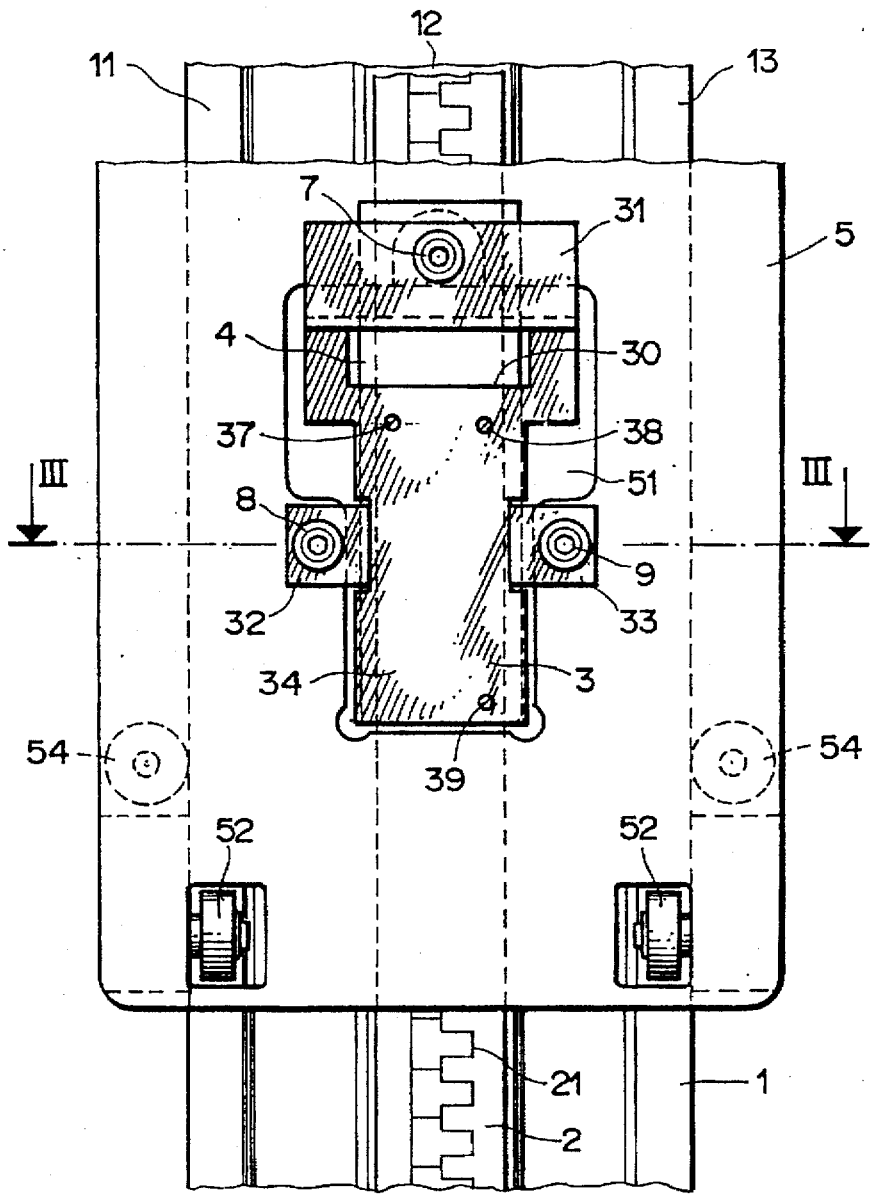
FIG. 1 shows a first view of the device.

FIG. 1 shows a part of the supporting structure 1 and of the slide 5 sliding on the supporting structure. In this example, the supporting structure, a single piece, is vertical and can be fixed to a bearing plate (not shown), which, in turn, can be fastened to the ground in a known way. The bearing plate can be displaceable by sliding, possibly on an air buffer. The slide 5, only the elements of which are necessary for understanding the invention being shown here, can be displaced along the supporting structure 1 using drive means (not shown). These drive means can be of the manual or motorized type. The slide can also be designed to be actuated directly by hand. The course of the slide is typically between about 300 mm and 1500 mm, for example, but the invention is applicable also to larger or smaller supporting structures. The desired precision for such a device is on the order of size of 0.001 mm to 0.01 mm, according to the method of reading used.

A measuring head having a tracer probe (not shown) is fastened to the slide 5. This tracer probe is put into contact with part of the piece to be measured when a measuring operation is carried out. Display means and/or printing means (not shown) then indicate the coordinate of the tracer probe in a system of coordinates generally associated with the supporting structure. Information processing of the data can be carried out already at this level, for example, to store, compare or subtract consecutive measured data. A connection with an external data processor for processing the measured data can also be foreseen, for example a serial connection of the type RS232.

Measurement of the coordinate takes place by means of a scale 2 fastened to the supporting structure and equipped with electrodes 21 as well as with a transducer 4 made up of an integrated circuit mounted on a transducer support 3. The transducer 4 is fastened, in this example by screw means 37, 38, 39, to the transducer support 3, which in turn is connected to the slide by mounting means which will be described further on. Measurement takes place in this preferred embodiment using capacitive type means by determining the inter-electrode capacitance resulting between the electrodes 21 of the scale 2 and the other electrodes (not shown) of the transducer 4. In a variant embodiment, reading is carried out by electro-optical means. The scale is then equipped with graduations and the transducer is a device for optically reading these graduations. In a second variant embodiment, the reading is carried out by magnetic-type means. The invention is also applicable to any other type of measuring means employing a transducer which displaces itself at a small distance facing a scale connected to a supporting structure.

Figure 3:
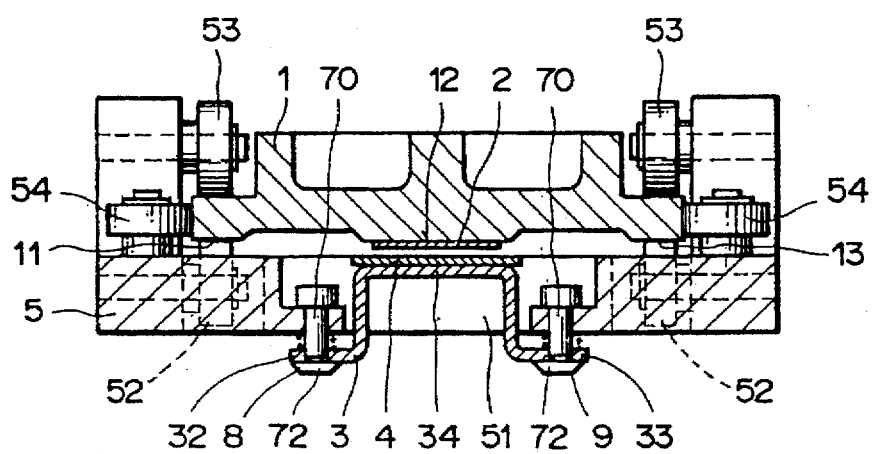
FIG. 3 shows a longitudinal section of the device, in the area of the scale.
Figure 2:
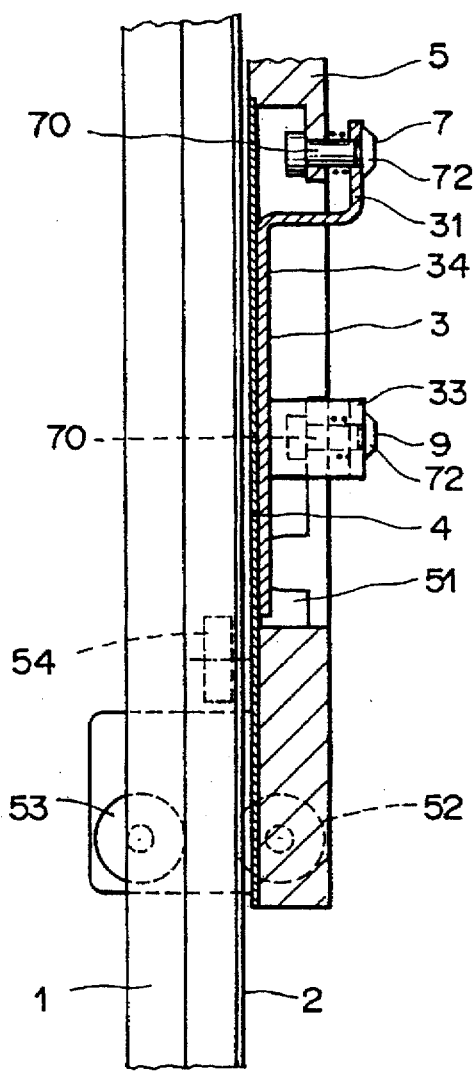
FIG. 2 shows a transverse section of the device.

The slide 5 can slide along supporting structure 1 by means of upper rollers 52, lower rollers 53 and lateral rollers 54 (visible in FIGS. 2 and 3). These rollers enclose the supporting structure on more than one face, as can be seen in particular in FIG. 3. The rollers can be distributed, for example, in groups of 3 at each angle of the slide. The slide slides parallel to the scale, without play, in the direction of measurement.

According to another feature of the invention, the upper rollers 52 roll on guide surfaces 11, 13 of the single-piece supporting structure, these guide surfaces being placed on the same plane as the surface 12 of the supporting structure to which the scale is fastened. The three surfaces 11, 12, 13, defining a single plane considered the plane of reference of the supporting structure, can be machined simultaneously with simple and economical machining methods, for example in a single precision grinding operation, ensuring a very exact surface evenness along the whole length of the supporting structure. In this way one can guarantee an absolutely parallel sliding of the slide without having to resort to complex and costly machining operations.

The slide 5 is provided with an opening 51. Accommodated therein opposite the scale 2 are the transducer support 3 and the transducer 4. The transducer support is fastened at at least three points to the slide by mounting means 7, 8, 9, which will be discussed further on in relation to FIG. 4. As the slide has a certain thickness, the transducer support has preferably the shape of a flat base plate 34 surmounted by footings 31, 32, 33 which permit fastening to the slide. In the example illustrated, there are as many footings as there are mounting means, but there could also be fewer footings than mounting means. The base plate 34 is accommodated at the bottom of the opening 51 while the footings 31, 32, 33 extend out of the opening 51 overhanging the slide, at an adjustable distance, as will be seen later on. The transducer is fixed firmly to the base plate 34, facing the scale, using any means of fastening, for example, screws 37, 38, 39. At least one opening 30 can be provided in the base plate 34 of the support 3 to reach without disassembly certain components of the transducer.

Figure 4:
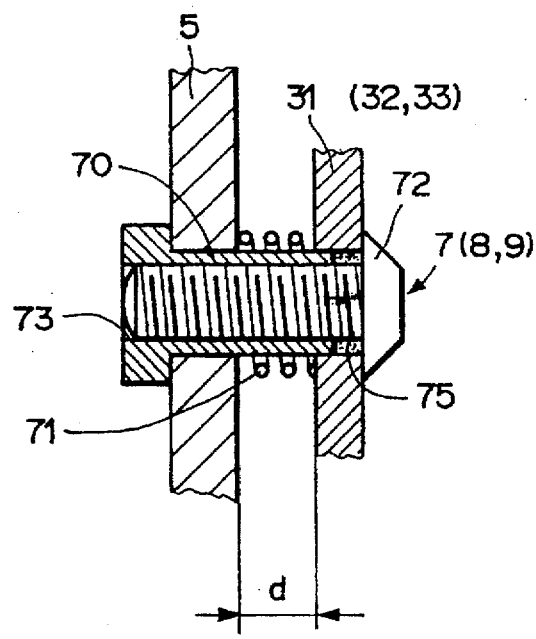
FIG. 4 shows one of the means for mounting the transducer and transducer support on the slide.

FIG. 4 illustrates a preferred embodiment of the mounting means 7, 8, 9 of the transducer support 3 to slide 5. According to one feature of the invention, mounting means permit changing the spacing d between the footings 31, 32, 33 and the slide 5 in a way to adapt the positioning and the orientation of the detection means 3, 4, and thus to adjust the parallelism and/or distance between the transducer 4 and the scale 2.

The transducer support 3 and the transducer 4 are connected to the slide, at the level of each footing of the transducer support, by mounting means 7, 8, 9, comprising a column 70 pierced at its center by an opening 73 threaded on at least one part of its length and in which a screw 72 will be engaged. A spring 71 surrounds each column. Any other type of equivalent, threaded piece which can be screwed into the column can be substituted for the screw.

The assembly formed by each column 70 and by the corresponding screws 72 at the same time passes through the transducer support and the slide 5. The springs 71 keep these two elements spaced apart in such a way that the footings of the transducer support 3 are pressed against the heads of screws 72, and the slide 5 is pressed against the heads of the columns 70. The action of the springs is thus to maintain as large a spacing between the footings 31, 32, 33 and the slide 5 as the engagement of screws 72 in the columns 70 permit and to maintain the positioning of the transducer support 3 and transducer 4 after adjustment. The springs are preferably springs of the spiral type and have a force sufficient to ensure a stable hold of the transducer support, in particular during the course of sliding of the slide. In a variant embodiment, the springs are of the O-ring type.

An action of screwing in or screwing out screws 72 permits change of the distance between the heads of the screws and the heads of the columns, and thus reduces or increases the distance between the slide and the footings 31, 32, 33 of the transducer support. With three points of mounting or more, one can thus adjust with precision the plane defined by the base plate 34 of the transducer support, and thus the plane defined by the transducer itself. Owing to the method of machining the supporting structure described above, which guarantees an absolutely parallel displacement of the slide 5 with respect to the supporting structure 1, a displacement of the transducer 4 in a plane parallel to the plane of the scale can thus be ensured.

The maximum length of the screw-column assembly depends on the tolerances imposed in the manufacture of the supporting structure and the slide, which directly influence the maximal value to be applied for corrections in distance or parallelism. For example, if the transducer 4 has a length of some centimeters, for example 6 cm, columns 70 can generally be used having a total length between some millimeters and some centimeters, for example 8 mm, permitting correction of imprecision to within some millimeters. These size ranges given as an example are valid with manufacturing tolerances commonly used for this type of measuring device, tolerances applied to the example embodiment illustrated by the figures. The threading on the interior of the column can be, for example, an M3 threading or another threading sufficiently fine to permit precise adjustment of the measuring means. The column can be made, for example, of stainless steel while the transducer support 3 is preferably made of aluminum or another material which can be worked on using operations of cutting, folding or metal or plastic injection. The transducer support permits essentially simplification of the construction of the transducer itself, which comprises a printed circuit difficult to machine to give it a complex shape.

Described now will be the method of adjusting the parallelism and the distance between the transducer 4 and the scale 2 according to the invention.

To carry out the adjustment, one introduces in the space between the transducer and the scale a shim of calibrated thickness corresponding to the distance of optimal operation of the transducer. Several calibrated shims can also be introduced, for example one shim close to each column 70. By means of screws 72, one can change the position and the orientation of the transducer support 3 and transducer 4 until one perceives at each mounting point a slight pinch of the shim or shims. At this moment the adjustment is completed. To prevent any risk of unscrewing, one can introduce a drop of glue 75 between the screws and the columns, the assembly should remain, however, easily dismount-able by means of the screws.

Although the foregoing describes a preferred embodiment of the invention, other embodiments which have not been illustrated will now be discussed.

To carry out an adjustment of parallelism between the plane of the transducer 4 and that of the scale 2, at least three mounting points 7, 8, 9, are necessary. However, more than three mounting points can be provided in order to stabilize the transducer 4 at the expense of a more complicated adjustment of the mounting screws, however. It is likewise possible to provide only two mounting points of the aforementioned type, each having a screw-column assembly 72-70, and one or more mounting points of a simplified type, not permitting variation of the distance d between the transducer support and the slide, but leaving, however, a certain-freedom of articulation between these elements.

These simplified mounting points can comprise, for example, a spring, a pivot or a hinge element. This arrangement, however, allows adjustment of only the parallelism between the transducer and the scale, but not adjustment of the distance. It is therefore suitable for types of transducers less sensitive to imprecision with respect to distance.

In a variant embodiment, the transducer support 3 comprises only a sole peripheral footing instead of a footing for each mounting point. The opening 51 in this variant embodiment is completely covered by a single footing extending around the entire flat base plate 34 of the transducer support.

Other different configurations for the slide 5 and/or the transducer support 3 and transducer 4 are possible which also permit the plane defined by the transducer 4 to be changed by acting upon the mounting means. The transducer support could be mounted, for example, from the other side of the slide, opposite the supporting structure 1, rather than from the outer side of the slide. In this configuration, the transducer support 3 has no footings, and the opening 51 in the slide is no longer necessary. In another variant embodiment, the transducer support is omitted entirely; the transducer is then fastened directly to the slide using mounting means 7, 8, 9, similar to those described above.

What is claimed is:

1. A linear measuring device comprising:

a supporting structure, a scale fixed on said supporting structure, a slide which can slide along said supporting structure, a transducer facing said scale and permitting in cooperation therewith to determine at least one coordinate of a point associated with said slide in a system of coordinates associated with said supporting structure, mounting means permitting to fix said transducer to said slide at at least three points, said mounting means including at at least one of said points a threaded piece engaged in an opening at least partially threaded and at least one spring, so that an action at each of the said points on said screw permits change of the spacing between said transducer and said slide, said spring keeping this spacing as large as the engagement of said screw in said opening permits, in a way to be able to adjust the parallelism and the distance between said transducer and said scale.

2. Device according to claim 1, further comprising a transducer support on which the said transducer is fixed, the said transducer support being itself fixed to said slide by means of said mounting means.

3. Device according to claim 2, wherein said slide comprises an opening and said transducer support comprises:

a base plate to which said transducer is fastened, said base plate being accommodated in said opening, at least one footing permitting fastening to said slide, said footing or footings extending out of said opening overhanging said slide at a distance adjustable with the aid of said mounting means.

4. Device according to claim 2, wherein the said mounting means at at least one of the said points further comprise a column pierced at its center by the said threaded opening on at least one part of its length, the screw-column assembly being surrounded by the said spring, the said screw-column assembly passing through the slide and the transducer support in such a way that it is possible by acting upon the said screw to change the spacing between the slide and the transducer support.

5. Device according to claim 1, wherein the slide includes rollers permitting it to slide along the supporting structure, said supporting structure including guide surfaces belonging to the same plane as the surface of the supporting structure to which the scale is fastened, at least part of the rollers rolling on said guide surfaces.

6. Device according to claim 1, wherein the transducer is connected to the slide by mounting means at three points.

7. Method of adjusting an electronic linear measuring device having a supporting structure, a scale fastened to said supporting structure, a slide which can slide along said supporting structure, a transducer fastened at at least three points to said slide, said transducer permitting measurement of the displacement of said slide with respect to the scale, wherein it comprises the following operations:

introduction of at least one element permitting a comparison to be made of the distance between the scale and the transducer with one or more calibrated distances;

adjustment of at least one screw for positioning and orientation of said transducer until the distance at each of the said points corresponds to a calibrated distance, maintaining of the positioning of said transducer after the adjustment by a spring provided at each of the said points.

8. Method according to claim 7, wherein the said element of comparison is a shim introduced between said scale and said transducer.

* * * * *